(12) United States Patent
Roy et al.

(10) Patent No.: US 9,317,252 B2
(45) Date of Patent: Apr. 19, 2016

(54) METHODS, SYSTEMS, AND COMPUTER READABLE MEDIA FOR SELECTING NUMBERS FROM MULTIPLE RANGES

(71) Applicant: Ixia, Calabasas, CA (US)

(72) Inventors: Niladri Sekhar Roy, Kolkata (IN); Sumit Panda, Kolkata (IN); Tathagata Chakraborty, Kolkata (IN)

(73) Assignee: IXIA, Calabasas, CA (US)

( * ) Notice: Subject to any disclaimer, the term of this patent is extended or adjusted under 35 U.S.C. 154(b) by 261 days.

(21) Appl. No.: 14/158,659

(22) Filed: Jan. 17, 2014

(65) Prior Publication Data

US 2015/0120797 A1    Apr. 30, 2015

(30) Foreign Application Priority Data

Oct. 25, 2013  (IN) ............................ 3174/DEL/2013

(51) Int. Cl.
*G06F 7/58* (2006.01)

(52) U.S. Cl.
CPC ...................................... *G06F 7/582* (2013.01)

(58) Field of Classification Search
CPC ........................................................ G06F 7/582
USPC ................................................. 708/250–256
See application file for complete search history.

(56) References Cited

U.S. PATENT DOCUMENTS

2009/0259704 A1*  10/2009  Aharoni .................... G06F 7/58
                                                                  708/210
2014/0067940 A1*  3/2014  Li ............................ G06F 17/30
                                                                  709/204
2014/0378057 A1*  12/2014  Ramon .................... H04L 9/32
                                                                  455/41.2

OTHER PUBLICATIONS

Commonly-assigned, co-pending U.S. Appl. No. 14/445,921 for "Methods, Systems, and Computer Readable Media for Scaling a Workload," (Unpublished, filed Jul. 29, 2014).
"Fisher-Yates Shuffle," http://en.wikipedia.org/wiki/Fisher-Yates_shuffle, pp. 1-11, (May 8, 2014).
Commonly-assigned, co-pending U.S. Appl. No. 14/251,547 for "Method and System for Hardware Implementation of Uniform Random Shuffling," (Unpublished, filed Apr. 11, 2014).
"ImpairNetTM—EIM1G4S, EIM10G4S, and EIM40G2Q Ethernet Impairment Load Module," pp. 1-5, (Jul. 2013).

* cited by examiner

*Primary Examiner* — Tan V. Mai
(74) *Attorney, Agent, or Firm* — Jenkins, Wilson, Taylor & Hunt, P.A.

(57) ABSTRACT

Methods, systems, and computer readable media for selecting numbers from multiple ranges are disclosed. One method includes receiving information associated with a plurality of ranges, selecting, by a module implemented using a non-transitory computer readable medium, iteratively selecting numbers from within the ranges such that, during a selection iteration, a given number within one of the ranges is not selected more than once and such that a sequence of numbers selected during the selection iteration appears to be random, and utilizing the numbers selected during the selection iteration to control at least one aspect of testing a network or storage device.

19 Claims, 6 Drawing Sheets

METHODS, SYSTEMS, AND COMPUTER READABLE MEDIA FOR SELECTING NUMBERS FROM MULTIPLE RANGES

PRIORITY CLAIM

This application claims the benefit of Indian Patent Application No. 3174/DEL/2013, filed Oct. 25, 2013; the disclosure of which is incorporated herein by reference in its entirety.

TECHNICAL FIELD

The subject matter described herein relates to testing devices. More specifically, the subject matter relates to methods, systems, and computer readable media for selecting numbers from multiple ranges.

BACKGROUND

When testing various devices, it is important to make sure that testing mimics real world scenarios and conditions. For example, when testing storage devices, it may be necessary to mimic a typical workload (e.g., an amount of work that is processed or handled by a device under test (DUT)). Conventional testing devices may provide predefined workloads for testing purposes. However, such workloads are limited and generally do not cover all scenarios that customers (e.g., storage device manufacturers or service providers) may want to test. For example, some customers may want to test device or resource usage or distribution that appears random and/or is unpredictable to an observer but that also meets other requirements or criteria, such as unique values and/or excluding or including certain values. While random number generation algorithms exist, such algorithms generally do not meet the other requirements that a tester may desire. Further, modifying existing random number generation algorithms to meet these requirements is cumbersome and time intensive.

Accordingly, in light of these difficulties, a need exists for improved methods, systems, and computer readable media for selecting numbers from multiple ranges.

SUMMARY

Methods, systems, and computer readable media for selecting numbers from multiple ranges are disclosed. One method includes receiving, information associated with a plurality of ranges, iteratively selecting, by a module implemented using a non-transitory computer readable medium, numbers from within the ranges such that, during a selection iteration, a given number within one of the ranges is not selected more than once and such that a sequence of numbers selected during the selection iteration appears to be random, and utilizing the numbers selected during the selection iteration to control at least one aspect of testing a network or storage device.

One system includes a communications interface configured to receive information associated with a plurality of ranges; and a module implemented using a non-transitory computer readable medium, wherein the module is configured to iteratively select numbers from within the ranges such that, during a selection iteration, a given number within one of the ranges is not selected more than once and such that a sequence of numbers selected during the selection iteration appears to be random and to utilize the numbers selected during the selection iteration to control at least one aspect of testing a network or storage device.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for selecting numbers from multiple ranges. When testing one or more devices, it may be desirable to select numbers from one or more ranges in a random or pseudo-random (e.g., appearing random) manner. For example, a storage device tester may want to test device load by accessing stored files of various sizes. The various sizes may be associated with percentages or proportions. For example, a list of X files may have different file sizes, where the sizes may be associated with different size ranges, and where the number of files in a given range is based on a percentage distribution. In this example, a storage device tester may want to select files in a given range at the same frequency as the range's percentage distribution, but in a random or pseudo-random manner. Table 1 below depicts a distribution table for indicating percentages or proportions of files in a file system object having particular characteristics, e.g., certain file sizes or size ranges.

TABLE 1

| 1 KB-10 MB | 11 MB-10 GB | 11 GB-100 GB |
|---|---|---|
| 25% | 50% | 25% |

In accordance with some aspects of the subject matter described herein, numbers may be selected from one or more ranges, e.g., such that the selection appears random. In some embodiments, a bit mapping mechanism or bit mapper may be used such that a number selection appears random. For example, a module may be configured to select a number from one of multiple number ranges, where each range may include five unique numbers. In this example, each range of numbers may be stored in an array or other data structure, e.g., a linked list, a table, or a collection. Each range may also be associated with a counter indicating a first number in the range to be processed. The module may use a function, algorithm, or other technique (e.g., a number generation function, like rand( )) for randomly or pseudo-randomly selecting one range from which a number is to be obtained. After selecting the range, a module may modify the first number identified by the counter using a bit mapper. The bit mapper may rearrange bits associated with the first number to generate or compute a second number. The second number may be modified (e.g., normalized) to generate or computer a third number that is associated with the same range of the first number. Hence, by using a bit mapper to rearrange bits when selecting a number, numbers from multiple ranges may be selected quickly and efficiently, while also appearing to be random.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
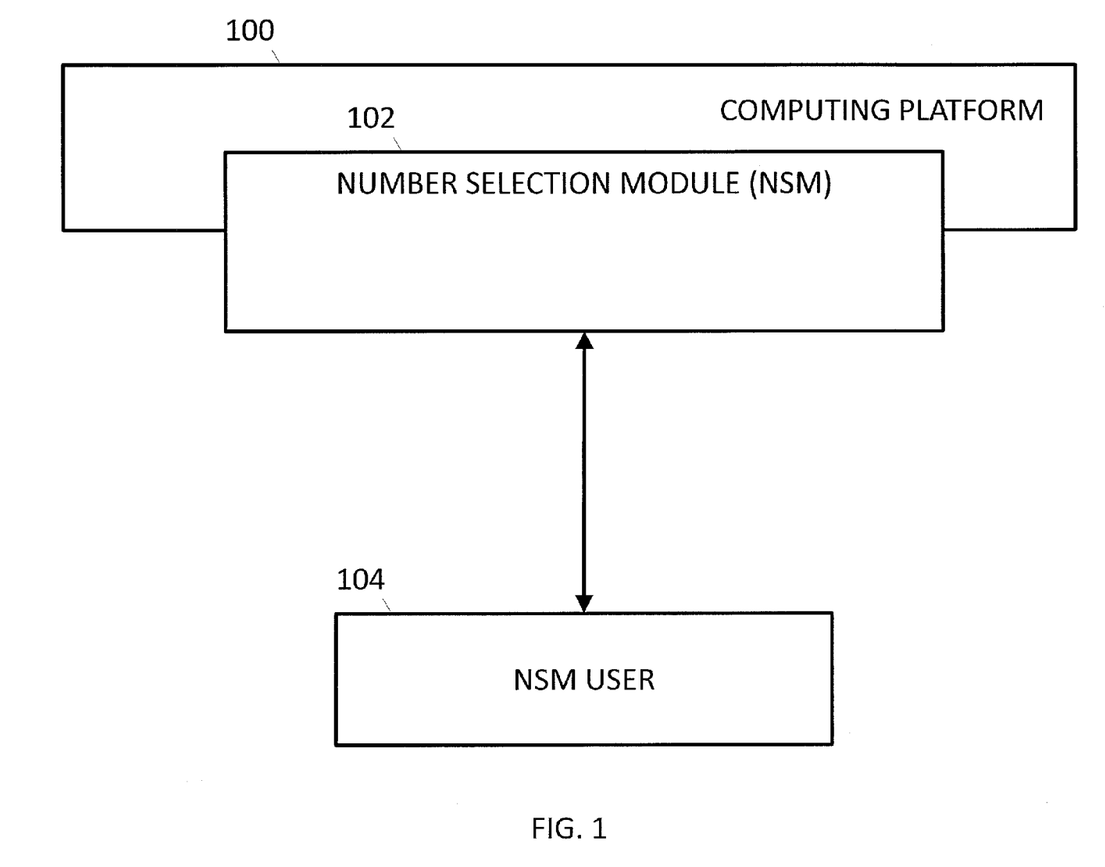
FIG. 1 is a diagram illustrating an exemplary computing platform for selecting numbers from multiple ranges according to an embodiment of the subject matter described herein.

FIG. 1 is a diagram illustrating an exemplary computing platform 100 for selecting numbers from multiple ranges according to an embodiment of the subject matter described herein. Computing platform 100 may represent any suitable entity or entities (e.g., a testing platform or a server farm) for performing number selection. For example, computing platform 100 may perform testing associated with a Windows Server file system, where a 1000 concurrent emulated users request an assorted mix of portable document (PDF) files, Word document (DOC) files, and PowerPoint (PPT) files. Thus, computing platform 100 may concurrently emulate multiple clients that request files of different sizes from a server.

In some embodiments, computing platform 100 may be a stand-alone tool, a testing device, or software executing on a processor. In some embodiments, computing platform 100 may be a single node or may be distributed across multiple computing platforms or nodes.

In some embodiments, numbers selected from one or more ranges may represent file sizes to be requested from the server being tested by the emulated clients.

Computing platform 100 may include a number selection module (NSM) 102. NSM 102 may be any suitable entity (e.g., software executing on a processor) for performing one or more aspects associated with number selection. NSM 102 may include functionality for selecting a number from one or more ranges in random or pseudo-random manner, e.g., using a bit mapping or bit rearranging mechanism. NSM 102 may be configured to use resources (e.g., memory and/or processing resources) efficiently.

In some embodiments, NSM 102 may provide functionality similar to a number generation library or function. For example, NSM 102 may receive information about one or more ranges and may provide a number from one of the one or more ranges, e.g., when requested via a function call. In some embodiments, information about one or more ranges may include numbers associated with a given characteristic (e.g., a file size or a size range) and may be indicative of a percentage distribution associated with the given characteristic. For example, where a total number of available files is 100, numbers 0-9 may represent 10 files having a file size of 1 KB (e.g., 10 of 100 or a percentage distribution of 10%); numbers 10-24 may represent 15 files having a file size of 16 KB (e.g., 15 of 100 or a percentage distribution of 15%); numbers 25-44 may represent 20 files having a file size of 128 KB (e.g., 20 of 100 or a percentage distribution of 20%); numbers 45-69 may represent 25 files having a file size of 512 KB (e.g., 25 of 100 or a percentage distribution of 25%); numbers 70-79 may represent 10 files having a file size of 1 MB (e.g., 10 of 100 or a percentage distribution of 10%); numbers 80-89 may represent 10 files having a file size of 10 MB (e.g., 10 of 100 or a percentage distribution of 10%); numbers 90-98 may represent 9 files having a file size of 100 MB (e.g., 9 of 100 or a percentage distribution of 9%); and numbers 99-99 may represent 1 file having a file size of 1 GB (e.g., 1 of 100 or a percentage distribution of 1%). By providing information about the one or more ranges, NSM 102 may be usable to select numbers from the one or more ranges in a random or pseudo-random manner.

In some embodiments, output provided by NSM 102 may be usable in performing one or more actions, such as selecting, requesting or using resources. For example, prior to requesting a random or pseudo-random number using NSM 102, a testing device may associate resources (e.g., files) with various numbers, hence when a number is provided by NSM 102, the testing device may request, select, or use the resource corresponding to the number provided by NSM 102. In another example, a security device may associate actions (e.g., procedures) with various numbers, hence when a number is provided by NSM 102, the security device may execute the action corresponding to the number provided by NSM 102. By associating numbers and various actions, resources, or other objects, NSM 102 and related output (e.g., random or pseudo-random selected numbers) may be usable for various applications, include testing applications, security applications, and/or other activities.

In some embodiments, NSM 102 may be integrated with a testing device or platform. The testing platform may be configured to select resources having various characteristics (e.g., files having different sizes or size ranges) based on a distribution percentage or ratio. The testing platform or a related entity (e.g., a human operator) may provide information (e.g., numbers that correspond to files and their relative distributions) to NSM 102 such that NSM 102 may select numbers corresponding to the resources in a random or pseudo-random manner.

In some embodiments, NSM 102 may include or access data storage containing information related to a number selection environment, e.g., information usable to randomly or pseudo-randomly select numbers from one or more ranges. For example, NSM 102 may access data storage containing ranges or sets of numbers, counters that indicate current numbers in a range to be processed, and/or other information. Exemplary data storage may include non-transitory computer readable media, such as flash memory, random access memory, or other storage devices. In some embodiments, data storage may be external to and/or or integrated with computer platform 100 and/or NSM 102.

In some embodiments, NSM 102 may include one or more communications interfaces for interacting with users and/or nodes. For example, NSM 102 may provide a communications interface for communicating with NSM user 104. In some embodiments, NSM user 104 may be an automated system or may be controlled or controllable by a human user. NSM user 104 may provide information about a selection environment (e.g., information about a set of numbers or ranges) to NSM 102 and may request that a number be selected using this information from NSM 102.

In some embodiments, NSM user 104 may be one or more devices under testing (DUTs). For example, a DUT may be any suitable entity or entities (e.g., storage devices or storage filers) for providing or receiving information associated with a testing scenario. In this example, the DUT may provide information about a selection environment (e.g., information about a set of numbers or ranges) and may request that a number be selected using this information.

Figure 2:
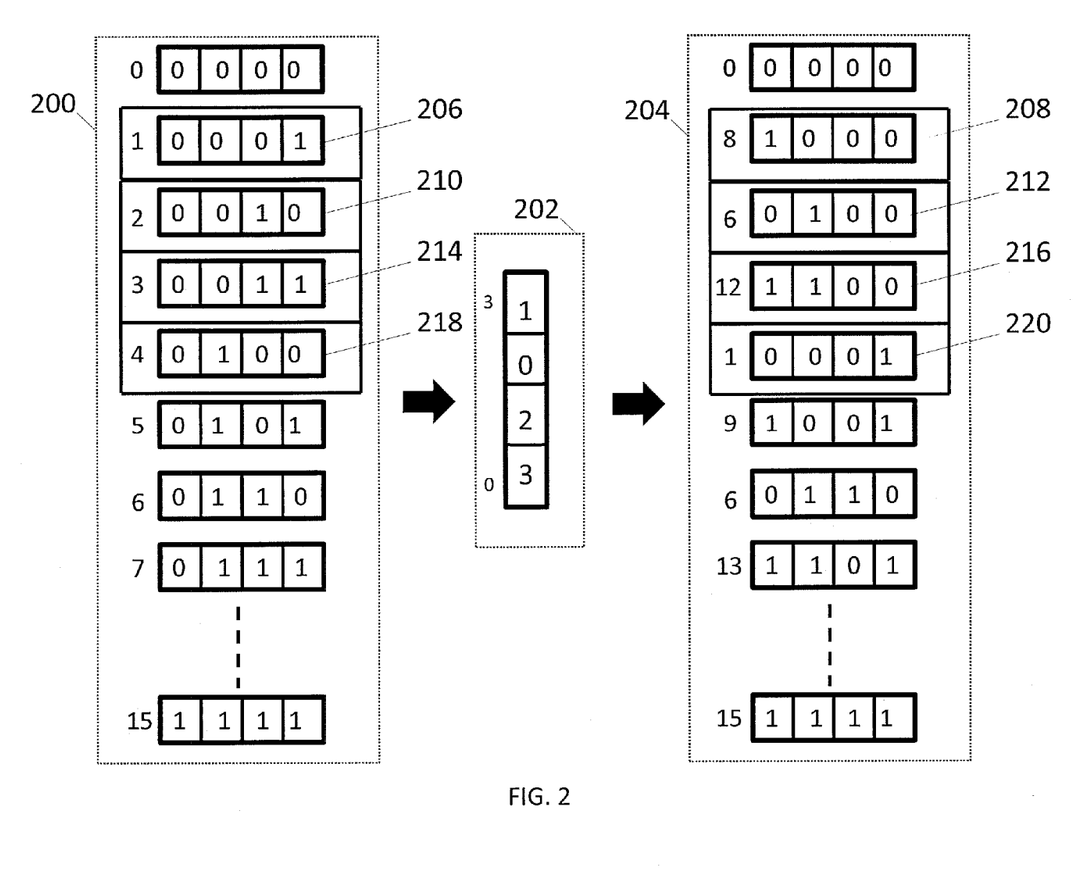
FIG. 2 is a diagram illustrating bit mapping according to an embodiment of the subject matter described herein.

FIG. 2 is a diagram illustrating bit mapping according to an embodiment of the subject matter described herein. In some embodiments, NSM 102 may be configured to select a number from one or more ranges (e.g., groups of numbers) where the selection meets various criteria or requirements. For example, exemplary requirements may include (1) generating or selecting unique numbers from one or more ranges, (2) avoiding selecting the same number twice during a selection iteration (e.g., no number may be selected again until all numbers from one or more ranges are selected at least once or until a new selection iteration occurs, (3) selection should appear random or arbitrary (e.g., selected numbers should not be consecutive), (4) consecutive sequences from different selection iterations should be unique (e.g., not identical).

In some embodiments, NSM 102 may store a range (e.g., a set of numbers) in an array, a list, or other data structure. NSM 102 may also use a mechanism, such as a counter, for keeping track of a current number in the range. For example, a range (e.g., 1-4) may be ordered from lowest value to highest value (e.g., 1, 2, 3, and 4), a counter may start at a lowest value in a range and, after the number is processed, the counter may be incremented to the next lowest value, and so on. In this example, the counter may start at 1, be incremented to 2, be incremented to 3, and then be incremented to 4. In some embodiments, as a number from a range is selected for processing, a counter may be incremented to a next number in the range. By using a counter which increments sequentially through a range of values, NSM 102 may perform number selection that generates or selects unique numbers from one or more ranges and avoids selecting the same number twice.

While using a counter which increments sequentially through a range of values may allow unique numbers to be selected, a counter may not provide an arbitrary (e.g., a random or pseudo-random) selection sequence. For example, if NSM 102 just returned values indicated by a counter which increments sequentially through a range of values, the returned numbers or selection sequence would be in sequential order. To provide an arbitrary selection sequence, one technique may include processing values indicated by a counter using a function, where the function produces output values in an arbitrary manner.

In some embodiments, NSM 102 may use a bit mapping mechanism, also referred to as a bit mapper, for arbitrary number selection, e.g., number selection that is random or appears to be random. A bit mapper may be a sequence of numbers usable for rearranging bits associated with a particular number. By rearranging bits, a bit mapper may generate seemingly arbitrary output from sequential or ordered input. For example, a number (e.g., a decimal representation of a number or a base 10 integer numeral) may be represented using one or more bits, e.g., using a binary or base 2 numeral system. In other words, a number in binary form may include one or more binary digits (e.g., bits), each digit may represent an increasing power of 2, with the rightmost digit representing $2^0$, the next digit representing $2^1$, and so on. Therefore, converting a binary number to a decimal representation may involve adding the products of the binary digits and the powers of 2 which they represent. In particular, if a binary number is '1001', the binary number may be converted to a decimal representation of '9' as follow: $1001=[(1)\times 2^3]+[(0)\times 2^2]+[(0)\times 2^1]+[(1)\times 2^0]=9$.

While rearranging bits associated with input numbers may be usable for producing a sequence of non-repetitive numbers from another sequence of non-repetitive numbers, there may be no guarantee that using a bit mapper and input numbers from a set of numbers between X and Y will generate or output numbers between X and Y. One way to guarantee that output numbers include numbers between X and Y may include using a number of bits N such that the number of bits N represents at least every number between X and Y. For example, using number of bits N, numbers between (and including) 0 and $2^N-1$ may be represented. In this example, using a fixed bit mapper and input numbers between (and including) 0 and $2^N-1$, output numbers may be generated between (and including) 0 and $2^N-1$.

Referring to FIG. 2, input numbers 200, a bit mapper 202, and output numbers 204 may be depicted. Input numbers 200 may be a sequence of numbers between 0-15 represented as binary numbers. Input numbers 200 may be usable as input for a bit mapping process involving bit mapper 202.

In some embodiments, input numbers 200 may be generated after receiving information about a number selection environment (e.g., information about one or more ranges of selectable numbers). For example, NSM user 104 may initialize an instance of NSM 102 and may provide information about a range of selectable values (e.g., 2, 3, 4, 5, 6, 7, 8, 9, 10, and 11). In this example, after receiving and/or storing the information about the range of selectable values, NSM 102 may calculate a minimum number of bits N required to represent at least all numbers in the range of selectable numbers. For example, if a given range of selectable numbers is between (and including) 2 and 11, a minimum number of bits N may be determined by determining a length L of selectable numbers (e.g., L=11−2=9) and determining a minimum number of bits capable of representing L using binary digits (e.g., 9="1001" requires 4 bits). Using the minimum number of bits N, NSM 102 may populate a data structure (e.g., an array) with all the numbers between (and including) 0 and 15 (e.g., $2^4-1$). NSM 102 may then process these numbers using bit mapper 202 or another bit mapping mechanism.

In some embodiments, input numbers 200 may be associated with a counter. For example, the counter may start at the lowest number (e.g., 0) of input numbers 200 and, as a number is processed using a bit mapper, the counter may be incremented to a next lowest number (e.g., 1). In this example, as input numbers 200 are processed, the counter may be incremented sequentially.

Bit mapper 202 may include information for rearranging bits associated with a first number to generate a second number. In some embodiments, bit mapper 202 may be the same length as a minimum number of bits N capable of representing a difference between a maximum number in a range and a minimum number in the range.

In some embodiments, a bit mapper may be a sequence, an array, or a list of numbers which indicates how bits of an input number are rearranged into an output number. For example, assuming a bit mapper is "2103" and a starting bit index position of 0 for an input number, the bit mapper may indicate that a bit of the input number at a bit index position of three (e.g., the farthest left bit) may be moved to a bit index position of two, a bit of the input number at a bit index position of two may be moved to a bit index position of one, a bit of the input number at a bit index position of one may be moved to a bit index position of zero, and a bit of the input number at a bit index position of zero may be moved to a bit index position of three. Continuing with this example, where a bit mapper "2103" and an input number is "9" (e.g., "1001"), an output number may be generated that is "12" (e.g., "1100").

Output numbers 204 may be a sequence of numbers between 0-15 represented as binary numbers. Output numbers 204 may be generated by using bit mapper 202 to swap or rearrange bits associated with input numbers 200. In some embodiments, output numbers 204 may be in an arbitrary (e.g., generally non-sequential) order. For example, after processing an input number 206 (e.g., "0001" or 1) using bit mapper 202, an output number 208 (e.g., "1000" or 8) may be generated. In another example, after processing an input number 210 (e.g., "0010" or 2) using bit mapper 202, an output number 212 (e.g., "0100" or 6) is generated.

In some embodiments, output numbers 204 may be modified such that the output numbers 204 are within a range of selectable numbers. For example, if a range of selectable numbers is between (and including) 2 and 11 and output numbers 204 are between (and including) 0 and 15, all output numbers 204 may modified by adding a value equal to the minimum number in the range of selectable numbers (e.g., 2). For example, where a range of selectable numbers is between (and including) 2 and 11, output number 220 (e.g., 1) may be modified by adding 2 (e.g., 1+2=3), thereby yielding 3 which is a selectable number between 2 and 11.

In some embodiments, output numbers 204 or modified output numbers 204 may be discarded, e.g., if the output numbers 204 or the modified output numbers 204 are outside a range of selectable numbers (e.g., if number >L, where L is length of selectable numbers). For example, where a range of selectable numbers is between (and including) 2 and 11, output number 216 (e.g., 12) or modified output number 216 (e.g., 12+2=14) may be outside the range of selectable numbers and, as such, may not be returned by NSM 102. In this example, instead of returning output number 216 (e.g., 12) or modified output number 216, output number 220 may be generated, modified, and, if within the range of selectable numbers, output number 220 may be returned by NSM 102.

Figure 3:
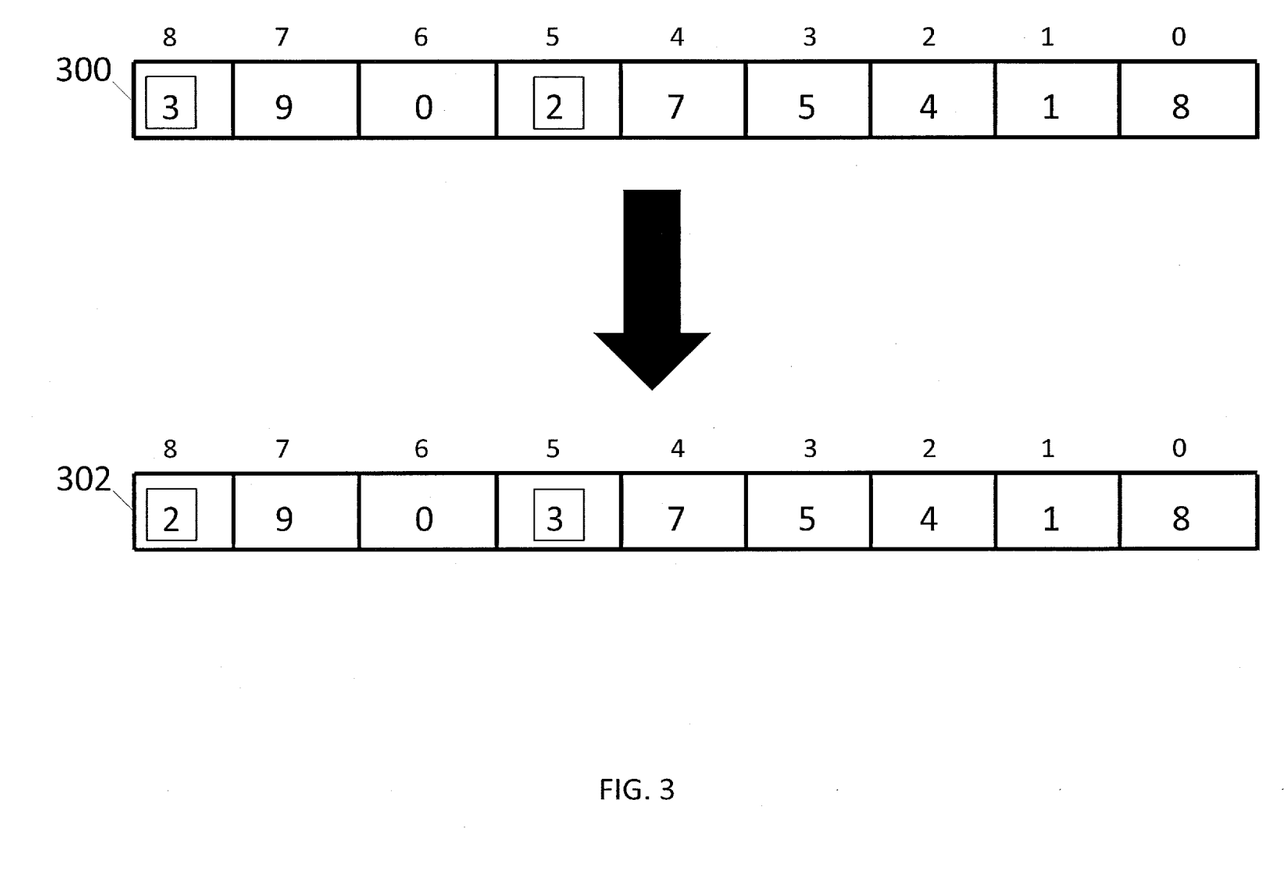
FIG. 3 is a diagram illustrating generating a new bit mapper according to an embodiment of the subject matter described herein.

FIG. 3 is a diagram illustrating generating a new bit mapper according to an embodiment of the subject matter described herein. In some embodiments, a bit mapper may be generated that is unique (e.g., different) for every range and/or selection iteration. For example, during a first selection iteration (e.g., a first instance of NSM 102), a bit mapper for range 1 may be "0321", a bit mapper for range 2 may be "503421", and a bit mapper for range 3 may be "865734021" and, during a second selection iteration (e.g., a second instance of NSM 102), a bit mapper for range 1 may be "3021", a bit mapper for range 2 may be "403521", and a bit mapper for range 3 may be "465738021".

In some embodiments, generating a new bit mapper may include using an algorithm or method to rearrange at least one bit representing an original bit mapper to generating the new bit mapper. Exemplary algorithms or methods usable for shuffling or rearranging at least one bit of an original bit mapper include a modern Fisher-Yates Shuffle technique, Sattolo's algorithm, or other shuffling methods.

Referring to FIG. 3, a new bit mapper 302 may be generated using a shuffling technique (e.g., Sattolo's algorithm) and an original bit mapper 300. For example, generating new bit mapper 302 may include randomly or pseudo-randomly selecting a number (e.g., using a rand( ) function) between a first index (e.g., 0) and a last index (L-1) (e.g., 8-1=7) of original bit mapper 300. In this example, the number selected may be "2" which is located at an index position of 5. The selected number may be shuffled or swapped with a number in a last index position (e.g., "3" which is located at an index position of 8). By swapping these bits, new bit mapper 302 may be generated that is different from bit mapper 300.

In some embodiments, (e.g., to ensure that consecutive generated bit mappers are different) a second bit mapper may be generated by randomly or pseudo-randomly selecting a value from between index positions 0 to (L-2) (e.g., 8-2=6) and shuffling it with the index position (L-1) (e.g., 8-1=7). Similarly, a third bit mapper may be generated by randomly or pseudo-randomly selecting a value from between index positions 0 to (L-3) (e.g., 5) and shuffling it with an index position of (L-2) (e.g., 6), and so on and so forth. When a computed index position (e.g., L-8) equals 0 or less than 0, the computed index position may start over at L or L-1.

Figure 4A:
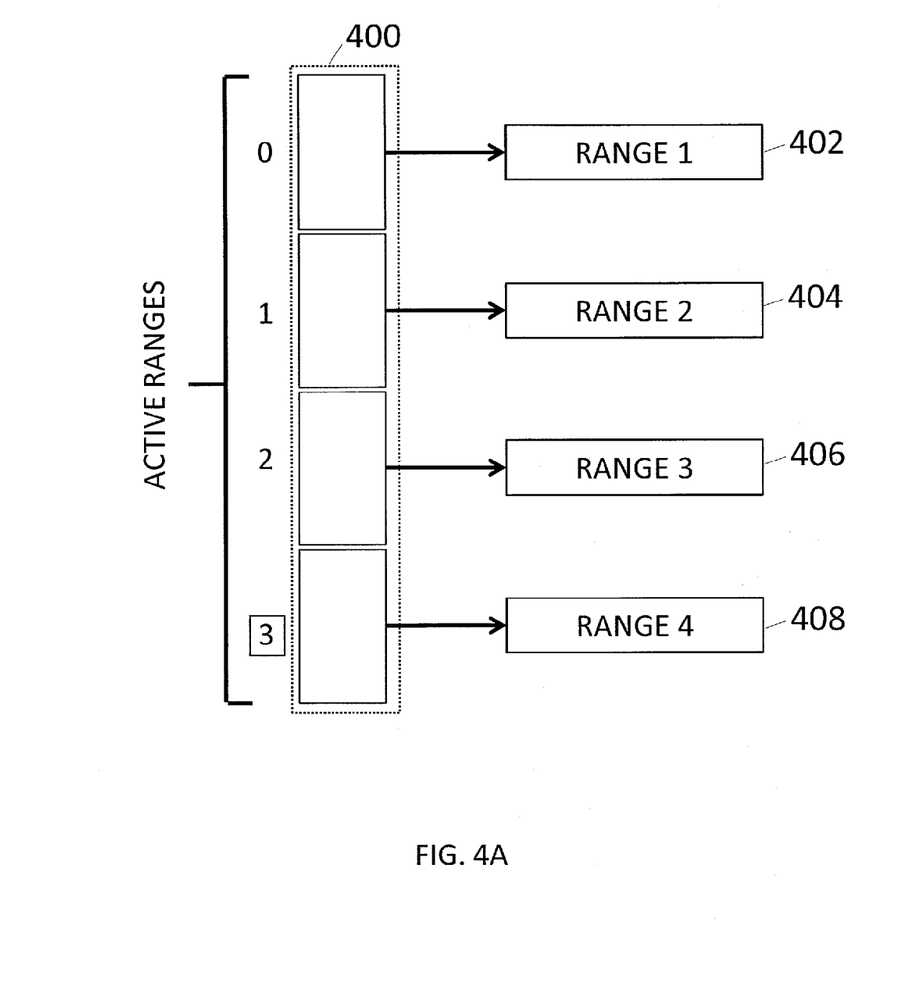
FIG. 4A is a diagram illustrating a master context containing a group of active ranges according to an embodiment of the subject matter described herein.

FIG. 4A is a diagram illustrating a master context 400 containing a group of active ranges according to an embodiment of the subject matter described herein. In some embodiments, NSM 102 or a related module may be configured to select numbers from multiple ranges of numbers.

In some embodiments, NSM 102 may create or store each range of numbers in a range context. A range context may be a data structure, such as a list or an array, or any other suitable entity for maintaining range-related information, such a set of numbers, a counter, and/or a bit mapper. Each range context may include a counter or other mechanism for tracking a current position in the range counter. For example, a counter may indicate that a first number is the next number in a given range to be processed using a bit mapper. In some embodiments, each range context may also be associated with a bit mapper. In such embodiments, an associated bit mapper may be unique for different selection iterations and/or may be different from bit mappers associated with other range contents.

In some embodiments, NSM 102 may use a master context. The master context may be data structure, such as an array or a list, to keep track of multiple range contexts. Using the master context, NSM 102 may randomly or pseudo-randomly select a range context from which a number is selected for processing. If no unique numbers (e.g., a number yet to be selected during a given selection iteration) exists in a range context, the range context may be avoided or removed from the master context, e.g., for the duration of a selection iteration. For example, NSM 102 may store pointers associated with range contexts still containing numbers that have yet to be processed or selected in a master context. When all numbers associated with a range context have been selected or processed, NSM 102 may remove the range context or otherwise mark the range context such that a number is not selected or processed from the range content. Thus, using the data structure, Referring to FIG. 4A, master context 400 may include pointers, references, or other information associated with range contexts 1-4 402-408 may include range information, including a set of numbers, a counter, and an associated bit mapper. In some embodiments, master context 400 may be an array, where each index of the array is indicative of a particular range context. Using a selection method (e.g., a rand( ) function), NSM 102 may select a third index of master context 400 indicative of range 4 408. NSM 102 may process a number indicated by a counter associated with range 4 408. The processing may include generating a second number using an associated bit mapper and may include modifying the second number to generate a third number. If the third number is within a range of selectable numbers associated with range 4 408, the third number may be returned or outputted by NSM 102 as the selected number. By using master context 400 and range contexts 1-4 402-408, NSM 108 may efficiently select a number from one of a plurality of ranges, where the selection appears random.

Figure 4B:
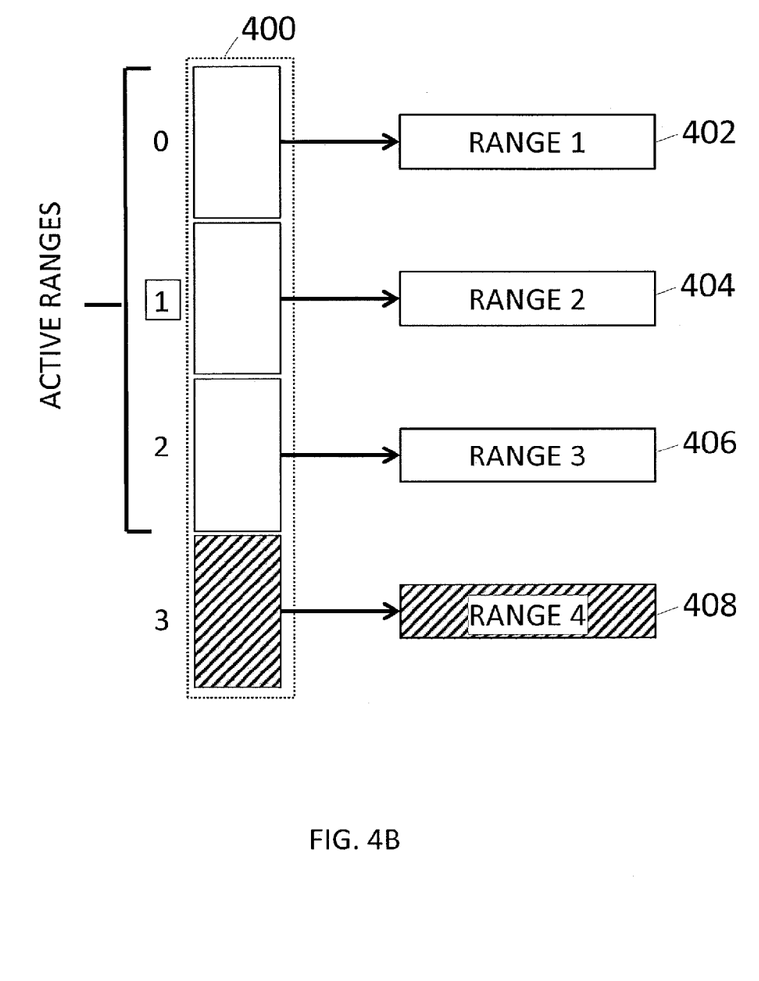
FIG. 4B is a diagram illustrating the master context of FIG. 4A containing a group of active ranges after one range is exhausted according to an embodiment of the subject matter described herein.

FIG. 4B is a diagram illustrating master context 400 containing a group of active ranges after one range is exhausted according to an embodiment of the subject matter described herein. In some embodiments, master context 400 may be an array, where each index of the array is indicative of a particular range context. In some embodiments, when a range context is exhausted (e.g., when all numbers associated with the range context has been selected or processed), the exhausted range context may be moved, marked, or otherwise prevented from being selected from for the duration of a selection iteration. For example, a reference to an exhausted range context may be moved to a last index of the array. In this example, NSM 102 may maintain an active range count. The active range count may be usable such that NSM 102 selects only range contexts still containing numbers yet to be selected or processed.

In some embodiments, if an active range count reaches zero, a new selection iteration may occur and the active range count may revert to an initial number of range contexts, thereby allowing NSM 102 to select numbers from all existing range contexts.

Figure 5:
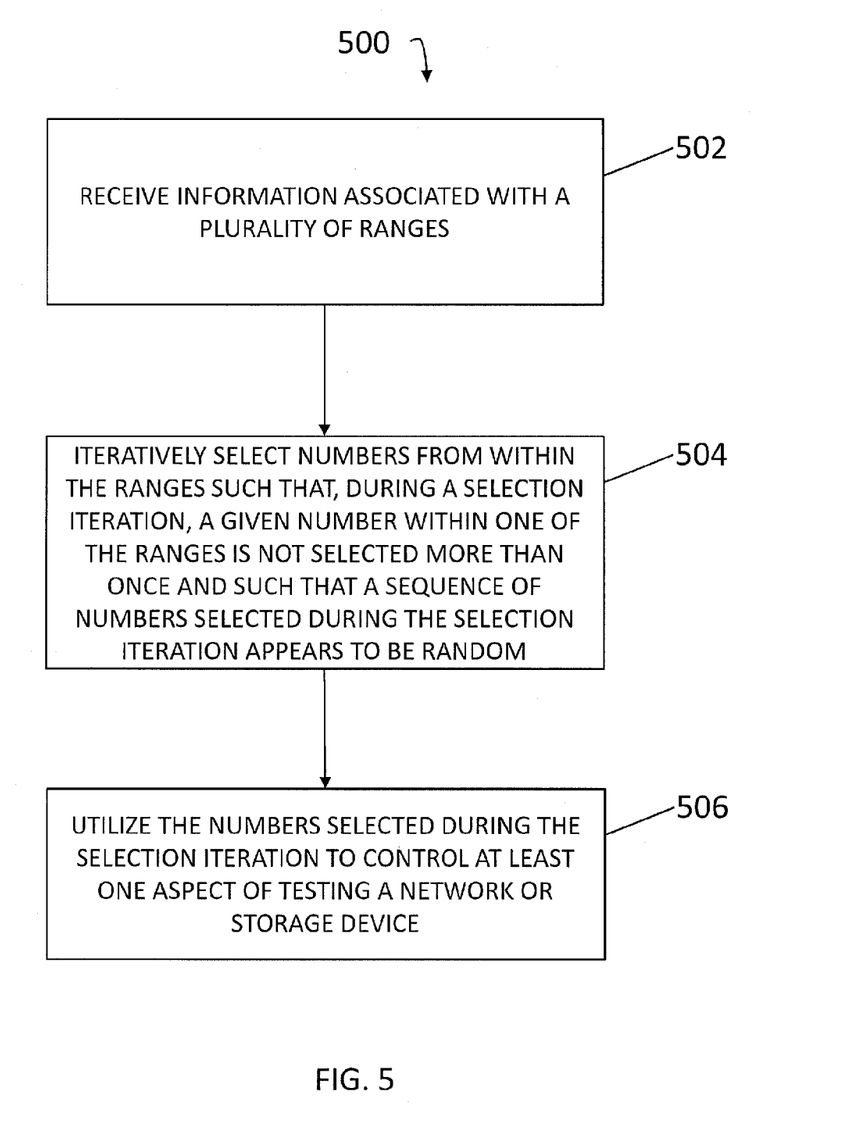
FIG. 5 is a diagram illustrating an exemplary process for selecting numbers from multiple ranges according to an embodiment of the subject matter described herein.

FIG. 5 is a diagram illustrating an exemplary process 500 for selecting numbers from multiple ranges according to an embodiment of the subject matter described herein. In some embodiments, exemplary process 500, or portions thereof, may be performed by or at computing platform 100, NSM 102, and/or another node or module. In some embodiment, exemplary process 500 may include steps 502 and/or 504.

At step 502, information associated with a plurality of ranges may be received by a communications interface. For example, NSM user 104 may provide, via a communications interface, sets or ranges of numbers (e.g., 1-4, 100-150, and 1000-1400) to NSM 102. Each range may include one or more numbers and numbers in one range may not appear in a second range. In some embodiments, the communications interface may be integrated with NSM 102 or another module or node. It is understood that receiving information associated with a plurality of ranges via a communications interface may include reading the range information from a file that is accessible via the communications interface.

At step 504, numbers from within the ranges are iteratively selected such that, during a selection iteration, a given number within one of the ranges is not selected more than once and such that a sequence of numbers selected during the selection iteration appears to be random.

In some embodiments, a selection iteration may include selecting a number associated with one of a plurality of ranges until every number in each of the plurality of ranges is selected at least once. In some embodiment, a selection iteration may be associated with an instance of a NSM 102, a testing period, and/or a NSM user 104.

In some embodiments, selecting a number may include storing a set of numbers associated with each range in data structures and selecting a first data structure that may include a number unselected during the selection iteration.

In some embodiments, selecting a first data structure may include selecting a first number from a set of numbers stored in the first data structure, rearranging bits associated with the first number to generate a second number, and modifying the second number to generate a third number, wherein the third number is a selected number usable for controlling at least one aspect of testing a network or storage device.

In some embodiments, selecting a first number from a set of numbers stored in a first data structure may include using a counter to sequentially select numbers stored in the first data structure.

In some embodiments, rearranging bits associated with a first number to generate a second number may include using a bit mapper, wherein the bit mapper is a sequence of numbers usable for rearranging bit locations for the bits associated with the first number to generate the second number.

In some embodiments, a bit mapper may be unique (e.g., different) for each of a plurality of ranges.

In some embodiments, a bit mapper may be unique (e.g., different) for each of a plurality of selection iterations.

In some embodiments, a bit length associated with a bit mapper may be determined by determining a minimum number of bits capable of representing a difference between a maximum number in a set of numbers (e.g., a range) and a minimum number in the set of numbers.

In some embodiments, modifying a second number to generate a third number may include adding a value to the second number, where the value added is equal to a minimum number in a set of numbers.

At step 506, the numbers selected during the selection iteration may be utilized to control at least one aspect of testing a network or storage device. For example, one or more selected numbers may represent one or more files of various sizes for requesting, modifying, or accessing. In this example, computing platform 100 may request the files represented by the selected numbers, e.g., outputted by NSM 102.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for selecting numbers from multiple ranges, the method comprising:
    receiving information associated with a plurality of ranges;
    iteratively selecting, by a module implemented using a non-transitory computer readable medium, numbers from within the ranges such that, during a selection iteration, a given number within one of the ranges is not selected more than once and such that a sequence of numbers selected during the selection iteration appears to be random; and
    utilizing the numbers selected during the selection iteration to control at least one aspect of testing a network or storage device.

2. The method of claim 1 wherein the selection iteration includes selecting a number associated with one of the plurality of ranges until every number in each of the plurality of ranges is selected at least once.

3. The method of claim 1 wherein selecting the numbers includes storing a set of information associated with each range in data structures and selecting a first data structure that includes a number unselected during the selection iteration.

4. The method of claim 3 wherein selecting the first data structure includes selecting a first number from a set of numbers stored in the first data structure, rearranging bits associated with the first number to generate a second number, and modifying the second number to generate a third number, wherein the third number is a selected number usable for controlling at least one aspect of testing a network or storage device.

5. The method of claim 4 wherein selecting the first number from a set of numbers stored in the first data structure includes using a counter to sequentially select numbers stored in the first data structure.

6. The method of claim 4 wherein rearranging bits associated with the first number to generate a second number includes using a bit mapper, wherein the bit mapper is a sequence of numbers usable for rearranging bit locations for the bits associated with the first number to generate the second number.

7. The method of claim 6 wherein the bit mapper is unique for each of the plurality of ranges.

8. The method of claim 6 wherein a bit length associated with the bit mapper is determined by determining a minimum number of bits capable of representing a difference between a maximum number in the set of numbers and a minimum number in the set of numbers.

9. The method of claim 8 wherein modifying the second number to generate a third number includes adding a value to the second number, wherein the value is equal to the minimum number in the set of numbers.

10. A system for selecting numbers from multiple ranges, the system comprising:
a communications interface configured to receive information associated with a plurality of ranges; and
a module implemented using a non-transitory computer readable medium, wherein the module is configured to iteratively select numbers from within the ranges such that, during a selection iteration, a given number within one of the ranges is not selected more than once and such that a sequence of numbers selected during the selection iteration appears to be random and to utilize the numbers selected during the selection iteration to control at least one aspect of testing a network or storage device.

11. The system of claim 10 wherein the selection iteration includes selecting a number associated with one of the plurality of ranges until every number in each of the plurality of ranges is selected at least once.

12. The system of claim 10 wherein the module is configured to store a set of numbers associated with each range in data structures and to select a first data structure that includes a number unselected during the selection iteration.

13. The system of claim 12 wherein the module is configured to select a first number from a set of numbers stored in the first data structure, to rearrange bits associated with the first number to generate a second number, and to modify the second number to generate a third number, wherein the third number is a selected number usable for controlling at least one aspect of testing a network or storage device.

14. The system of claim 13 wherein the module is configured to select the first number from the set of numbers stored in the first data structure using a counter to sequentially select numbers stored in the first data structure.

15. The system of claim 13 wherein the module is configured to rearrange bits associated with the first number to generate a second number using a bit mapper, wherein the bit mapper is a sequence of numbers usable for rearranging bit locations for the bits associated with the first number to generate the second number.

16. The system of claim 13 wherein the bit mapper is unique for each of the plurality of ranges.

17. The system of claim 13 wherein a bit length associated with the bit mapper is determined by determining a minimum number of bits capable of representing a difference between a maximum number in the set of numbers and a minimum number in the set of numbers.

18. The system of claim 17 wherein modifying the second number to generate a third number includes adding a value to the second number, wherein the value is equal to the minimum number in the set of numbers.

19. A non-transitory computer readable medium comprising computer executable instructions embodied in the computer readable medium that when executed by a processor of a computer control the computer to perform steps comprising:
receiving information associated with a plurality of ranges;
iteratively selecting numbers from within the ranges such that, during a selection iteration, a given number within one of the ranges is not selected more than once and such that a sequence of numbers selected during the selection iteration appears to be random; and
utilizing the numbers selected during the selection iteration to control at least one aspect of testing a network or storage device.

* * * * *